United States Patent
Sack et al.

(10) Patent No.: US 11,121,538 B2
(45) Date of Patent: Sep. 14, 2021

(54) ELECTRONIC CIRCUIT ARRANGEMENT FOR USE IN AN AREA EXPOSED TO EXPLOSION HAZARDS

(71) Applicant: ECOM Instruments GmbH, Assamstadt (DE)

(72) Inventors: Norbert Sack, Lauda-Koenigshofen (DE); Axel Sailer, Weikersheim (DE)

(73) Assignee: ECOM INSTRUMENTS GMBH

( * ) Notice: Subject to any disclaimer, the term of this patent is extended or adjusted under 35 U.S.C. 154(b) by 869 days.

(21) Appl. No.: 14/977,600

(22) Filed: Dec. 21, 2015

(65) Prior Publication Data

US 2016/0181784 A1 Jun. 23, 2016

(30) Foreign Application Priority Data

Dec. 22, 2014 (DE) .......................... 12014226864.8

(51) Int. Cl.
*H02H 3/00* (2006.01)
*H02H 7/00* (2006.01)
(Continued)

(52) U.S. Cl.
CPC .............. *H02H 3/08* (2013.01); *H02H 11/00* (2013.01)

(58) Field of Classification Search
CPC .................................. H02H 3/08; H02H 11/00
(Continued)

(56) References Cited

U.S. PATENT DOCUMENTS 3,746,938 A * 7/1973 Lamb ....................... H02H 5/00
307/328
6,366,434 B2 * 4/2002 Magnussen .......... H01H 47/004
361/166

(Continued)

FOREIGN PATENT DOCUMENTS

DE 29809550 U1 7/1999
DE 10361641 A1 10/2004
(Continued)

OTHER PUBLICATIONS

English abstract provided for DE-102013101314.
(Continued)

*Primary Examiner* — Jared Fureman
*Assistant Examiner* — Lucy M Thomas
(74) *Attorney, Agent, or Firm* — Fishman Stewart PLLC

(57) ABSTRACT

An electronic circuit arrangement may include first and second electric connections connectable to first and second electronic devices, respectively. A first electric conduction path may connect the first and second electric connections, and a second electric conduction path may connect a tee point provided in the first electric conduction path to an electric ground connection. First and second switching elements may be provided in the first and second electric conduction paths, respectively, between the tee point and the respective electric connection. Each switching element may switch between an open state, in which the switching element may interrupt the respective electric conduction path, and a closed state. In response to connecting the second electronic device to the second electronic connection, the second switching element may switch to the open state, and the first switching element to the closed state only after the second switching element is already in the open state.

17 Claims, 2 Drawing Sheets

(51) Int. Cl.
*H02H 9/02* (2006.01)
*H02H 3/08* (2006.01)
*H02H 11/00* (2006.01)

(58) Field of Classification Search
USPC .......................................................... 361/102
See application file for complete search history.

(56) References Cited

U.S. PATENT DOCUMENTS

| | | | | |
|---|---|---|---|---|
| 6,608,470 | B1* | 8/2003 | Oglesbee | H01M 2/348 |
| | | | | 320/135 |
| 2005/0013075 | A1* | 1/2005 | Kohlmeier-Beckmann | ................. |
| | | | | H02J 13/0024 |
| | | | | 361/62 |
| 2005/0146824 | A1* | 7/2005 | Borrego Bel | H02H 3/023 |
| | | | | 361/103 |
| 2007/0103834 | A1* | 5/2007 | Huang | H02H 3/087 |
| | | | | 361/104 |
| 2013/0250460 | A1 | 9/2013 | Grozinger et al. | |

FOREIGN PATENT DOCUMENTS

| | | |
|---|---|---|
| DE | 102010040833 A1 | 3/2012 |
| DE | 102013101314 A1 | 8/2014 |
| GB | 2396982 | 7/2004 |

OTHER PUBLICATIONS

German Office Action for DE-102014226864.8, dated Oct. 27, 2015.
German Office Action dated Jul. 24, 2020 related to corresponding German Patent Application No. 102014226864.8.

* cited by examiner

ELECTRONIC CIRCUIT ARRANGEMENT FOR USE IN AN AREA EXPOSED TO EXPLOSION HAZARDS

CROSS REFERENCE TO RELATED APPLICATIONS

This application claims priority to German Patent Application No. 102014226864.8, filed Dec. 22, 2014, which is hereby incorporated by reference in its entirety.

The instant invention relates to an electric circuit arrangement, in particular for use in an area exposed to explosion hazards.

For communication with other electronic/electronic devices, many mobile electronic devices, such as modern laptops or mobile telephones, for example, have electronic interfaces with one or a plurality of connecting elements, which can be attached to the outside of the device housing of the mobile electronic device. For example external peripherals for establishing a communication connection can be connected to the mobile electronic device via such electronic interfaces, which can be realized, for example, as so-called USB interfaces. Said electronic interfaces, however, can also be designed to connect an electric power supply unit, for instance in the form of an electric charger, instead of peripherals, to the mobile electronic device. A rechargeable battery of the electronic device can thus be recharged by electric power from the charger.

However, the above-described electronic interface represents a high hazard potential for the use of electronic devices in so-called areas exposed to explosion hazards, because a spark can be generated by means of the electric power provided at the electric connections of the interface, and because a gas-air mixture, which is present in the area exposed to explosion hazards, can thus be ignited.

To prevent this, provision is often made in common electronic devices for electronic protective circuits, by means of which it is to be prevented that electric power is applied to the interface, which is guided outwards and which is exposed, if no external electric/electronic device is connected to the interface. In the event that an external electric/electronic device is connected to the interface, the presence of such a protective circuit is to not impact the communication connection between the two connected devices at the same time.

It is an object of the instant invention to show new ways when developing electronic protective circuits.

This object is solved by means of an electronic circuit arrangement according to independent patent claim 1. Preferred embodiments are the subject matter of the dependent patent claims.

Accordingly, it is the basic idea of the invention to realize a protective circuit by means of an electronic circuit arrangement, in which an electric connecting line is grounded between a first electric/electronic device and a second electric/electronic device with the help of two switching elements, as long as the second electric/electronic device—typically a peripheral or charger, which supplements the first electric/electronic device—is not connected to the connecting line. A first switching element thereby serves to electrically interrupt the electric connecting line, a second switching element serves the purpose of connecting the electric connecting line to a ground connection for electrically grounding, as long as the second electric/electronic device is not connected to the electric connecting line. In the event that the second electric/electronic device is electrically connected to the connecting line, said interruption is eliminated accordingly and the grounding of the connecting line to the ground connection is eliminated as well.

A synchronization of the switch-over of the two switching elements between their open and their closed state in such a manner that an undesired electric connection between the two electric/electronic devices and the ground connection and an associated undesired electric short-circuit current is prevented at any point in time is thereby significant for the invention.

On principle, the electric connecting line—hereinafter referred to as "first electric conduction path"—thus serves the purpose of connecting the electric or electronic interface of the first electric/electronic device, which is guided outwards, to an external peripheral or an external charger—to simplify matters, hereinafter identified uniformly as "second electric/electronic device"—. To prevent thereby that electric power is provided at the interface of the first electric/electronic device, which is guided outwards, if it is not connected to the second electric/electronic device via the first electric conduction path and is thus "exposed, an electronic circuit arrangement according to the invention, which is based on the above-explained basic idea, is arranged between the first and the second electric/electronic device.

Such a circuit arrangement can be designed as part of the first electronic device. It is possible, for instance, that the first electric/electronic device is a mobile telephone or tablet PC. The second electric/electronic device can be an external charger, so as to charge a rechargeable battery, if necessary, which is provided in the first electric/electronic device. It is also possible that the second electric/electronic device is a peripheral, which supplements the first electric/electronic device.

An electronic circuit arrangement according to the invention comprises a first electric connection, to which a first electric/electronic device can be connected, and a second electric connection, to which a second electric/electronic device can be connected. Provision is furthermore made for a first electric conduction path, which electrically connects the first electric connection to the second electric connection. A second electric conduction path electrically connects a tee point, which is provided in the first electric conduction path, to an electric ground connection of the electronic circuit arrangement. To selectively interrupt the electric connection between the two connecting elements, provision is made in the first electric conduction path between the first electric connection and the tee point for a first switching element. The latter can be switched between an open state, in which it electrically interrupts the first electric conduction path, and a closed state, in which this interruption is eliminated. Provision is furthermore made in the second electric conduction path, thus between the tee point and the electric ground connection, for a second switching element. The second switching element can also be switched between an open state, in which is electrically interrupts the second electric conduction path, and a closed state, in which this interruption is eliminated.

If the second electric/electronic device is connected to the second electric connection and if it is thus connected to the first electric conduction path, an electric connection is to thus be at hand to the first electric connection and, via the latter, to the first electronic device, via which data or electric power can be transferred between the electric/electronic devices. According to the invention, the electronic circuit arrangement is equipped in such a manner that the first switching element switches over to the closed state in response to electrically connecting the second device to the second electric connection. In this state, however, the second switching element must not be in the closed state, because the two electric connections would otherwise be connected to the ground connection, which would result in an electric grounding of the two electric/electronic devices. An undesired short-circuit current could flow in this case, which could result in damages to the electric conduction paths as well as to the electric/electronic devices. According to the invention, the first switching element thus only switches over to the closed state, when the second switching element is already in the open state, in response to connecting the second electric/electronic device.

Vice versa, an electric disconnection of the second electric/electronic device from the second electric connection is to be associated with an electric grounding of the two electric conduction paths, so as to prevent that electric power is provided on the second electric connection, which is then free. According to the invention, the electronic circuit arrangement is thus equipped in such a manner that, when electrically disconnecting the external electric/electronic device from the second electric connection, the second switching element switches over to the closed state and the first switching element switches over to the open state. According to the invention, the switch-over of the two switching elements occurs in the course of the disconnection of the second electric/electronic device from the second electric connection in such a manner that the second switching element is switched over to the closed state only when the first switching element is already in the open state. This measure also prevents an undesired electric short-circuit of the two electric connections to the ground connection. By opening the first switching element, the first electric/electronic device is disconnected from the second electric connection. By closing the second switching element, electric power, which might be present in the first electric conduction path as well as in the second electric conduction path, is discharged via the ground connection in the form of electric charge carriers.

As a result, the circuit arrangement according to the invention allows for a secure grounding of the external interface of the first electric/electronic device, as long as a second electric/electronic device is not connected to this interface. At the same time, the electric connection between the two electric/electronic device is not impacted, as long as the two devices are electrically connected to one another via the electronic circuit arrangement. In particular, an undesired electric short-circuit of the electric/electronic devices with a ground connection is prevented in the course of the connection or disconnection, respectively, of the second electric/electronic device.

In a preferred embodiment, the first switching element is an electrically powerable electromagnetic relay. The latter is embodied in such a manner that it switches over to the closed state in an electrically powered state. In the electrically non-powered state, in contrast, it switches over to the open state. Analogously, the second switching element is also an electrically powerable electromagnetic relay, which, in an electrically powered state, switches over to the open state and, in an electrically non-powered state, it switches over to the closed state. The two relays can thus be connected to a power source via suitable electric connecting lines. Said power source can in particular be present in the second electric/electronic device. By providing an electric connection of the relays to the power source, which is present in the second electric/electronic device, the switch-over according to the invention of the switching elements can be realized in response to connecting or disconnecting, respectively, the second electric/electronic device from the circuit arrangement. The use of relays can furthermore ensure that, in the open state of the switching elements, the electric connection is interrupted completely in the first or in the second electric conduction path, respectively, which, according to legal provisions, is absolutely necessary for the use of the first electric/electronic device and the external interface thereof, if they are to be used in an area exposed to explosion hazards.

In a particularly advantageous manner, the electronic circuit arrangement can comprise a control unit, by means of which it can be determined, whether or not the tee point provided in the first electric conduction path is electrically connected to the ground connection. The control unit is equipped/programmed in such a manner in this scenario that, after connecting the second electric/electronic device to the second electric connection, it prevents an electric powering of the first switching element, which is embodied as relay, for the purpose of switching over to the closed state, until it was determined that the tee point is no longer connected to the ground connection. It is thus ensured according to the invention that a temporary electric short-circuit of the first supply line and thus of the two electric/electronic devices is not associated with the connection of the second electric/electronic device.

In an advantageous further development of the invention, the electronic circuit arrangement has a first sensor element, which cooperates with the control unit via a first sensor line. It can be determined by means of this sensor element, whether or not the electric tee point is electrically connected to the ground connection. The control unit can thus determine, whether the second switching element is in the open or in the closed state.

In an advantageous further development of the invention, provision is made in the first electric conduction path between the second electric connection and the tee point for a third switching element, which is embodied analogous to the first switching element. This means that the third switching element can also be switched between an open state, in which it electrically interrupts the first electric conduction path, and a closed state, in which this electric interruption is eliminated. According to this further development, the electronic circuit arrangement is equipped in such a manner, that the third switching element also switches over to the closed state in response to electrically connecting the second electric/electronic device to the second electric connection in addition to the first switching element. Said switch-over thereby occurs in such a manner that the third switching element is switched over to the closed state only when the second switching element is already in the open state. An undesired short-circuit of the second electric connection to the ground connection is thus prevented in the course of the switch-over process of the three switching elements. As do the first and the second switching element, the third switching element can also be embodied as electromagnetic, electrically powerable relay, so that the above explanations relating to the first and second switching element mutatis mutandis apply for the third switching element. With regard to the electric disconnection of the second electric/electronic device from the second electric connection, the electronic circuit arrangement is equipped in such a manner that, in addition to the first switching element, the third switching element also switches over to the open state, wherein the switch-over occurs in such a manner that the second switching element is switched over to the closed state only when the third switching element is already in the open state as well. An undesired electric short-circuit between the second connecting element and the ground connection is also prevented by means of this measure.

In a particularly preferred embodiment, a predetermined first time period defines a time period, which the first switching element requires for switching over from the closed to the open state. In the alternative or in addition, a predetermined third time period can define a time period, which the third switching element requires for switching over from the closed to the open state. Both time periods, thus first and third time period, can thereby have the same value or different values. According to this embodiment, a predetermined second time period defines a time period, which the second switching element requires for switching over from the open to the closed state. The electronic circuit arrangement is embodied in such a manner that the predetermined second time period is in each case larger than the predetermined first time period and/or the predetermined third time period. It can thus be ensured that, in response to disconnecting the power supply unit, the associated switch-over of the second switching element to the closed state occurs more slowly than the switch-over of the first or third switching element, respectively, to the open state. A state, in the case of which the second as well as the first/third switching element is closed, can thus be prevented. An electric short-circuit of the electronic device or of the power supply unit, respectively, to the ground connection is thus prevented.

In an advantageous further development, the electronic circuit arrangement can comprise an electronic delay circuit, which delays the switch-over of the second switching element from the open to the closed state in such a manner that the predetermined second time period is larger than the predetermined first time period and/or the predetermined third time period. It is thus ensured that, in response to disconnecting the second electric/electronic device, the first switching element and/or the third switching element is closed only at a point in time, at which the second switching element is already open.

In a further preferred embodiment, the first and/or the second and/or the third switching element can be connected by means of an electric supply line to a third electric connection of the electronic circuit arrangement, which can be connected to an electric power source, which is provided in the second electric/electronic device. If the switching elements are embodied as electromagnetic relays, the electric power required for electrically powering the relays, can be taken from the electric/electronic device. The switch-over of the switching elements according to the invention can thus also be realized in response to the connection or disconnection respectively, of the second electric/electronic device.

In an advantageous further development of the invention, the first and the third electric connection can be embodied in such a manner for this purpose that a connection of the second electric/electronic device is associated with an electric connection of the second electric/electronic device to the third electric connection. The first and the third electric connection can furthermore be embodied in such a manner that said electric connection is cancelled again in response to disconnecting the second electric/electronic device from the second electric connection.

In the event of a malfunction of the electronic circuit arrangement such that the first/third switching element does not properly switch over to the open state, an electric short-circuit of the first or second electric connecting element, respectively, with the ground connection, occurs when the second switching element is closed, which can damage the electronic device including the electronic circuit arrangement. To prevent this, a first electric fuse element is arranged in the first electric conduction path between the tee point and the first electric connection in the case of an advantageous further development. Said fuse element electrically interrupts the first electric conduction path, as soon as the electric current, which flows through the first electric fuse element, exceeds a predetermined maximum value.

In addition or in the alternative, a second electric fuse element can also be arranged in the first electric conduction path between the tee point and the second electric connection. This second electric fuse element permanently interrupts the first electric conduction path, as soon as the electric current, which flows through the second electric fuse element, exceeds a predetermined maximum value.

Further important features and advantages of the invention follow from the subclaims, from the drawings and from the corresponding figure description by means of the drawings.

It goes without saying that the features mentioned above and the features, which will be explained below, cannot only be used in the respectively specified combination, but also in other combinations or alone, without leaving the scope of the instant invention.

Preferred exemplary embodiments of the invention are illustrated in the drawings and will be explained in more detail in the description below, wherein the same reference numerals refer to components, which are the same or similar or functionally similar.

IN EACH CASE SCHEMATICALLY

Figure 1:
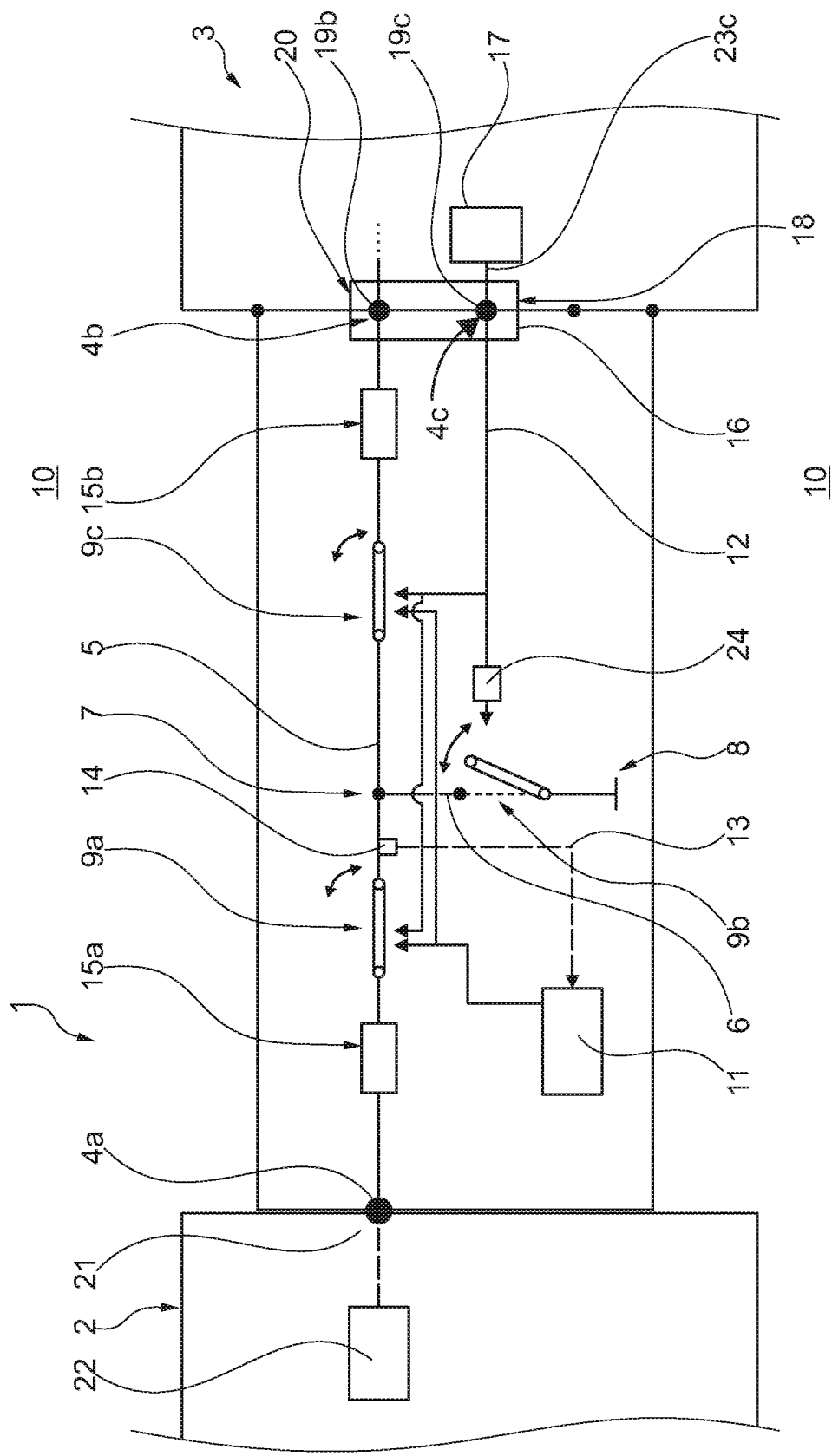
FIG. 1 shows an example of an electronic circuit arrangement according to the invention comprising an electric/electronic device, which is connected to the circuit arrangement.

FIG. 1 shows an example of an electronic circuit arrangement 1 according to the invention in a circuit diagrammatic illustration. The circuit arrangement 1 acts as electric/electronic connection circuit between the electric/electronic interface connection 21, which is guided outwards, of a first electric/electronic device 2 and the second electric/electronic device 3, which can be electrically connected to this interface connection 21. According to the invention, the electronic circuit arrangement 1 is designed to ensure that no electric power can reach via the interface connection 21 to the outside into the environment 10 of the first electric/electronic device 2, when the second electric/electronic device 3 is not electrically connected to the first electric/electronic device 2.

For example, the first electric/electronic device 2 can be a mobile telephone or a portable computer, in particular a tablet PC. The second electric/electronic device 3 can be an external peripheral for the first electric/electronic device 2. It can in particular be an electric charger, by means of which a rechargeable battery 22, which is present in the first electric/electronic device 2, can be recharged electrically. The electronic circuit arrangement 1 can be a part of the first electric/electronic device 2 and can be integrated for example into a housing of the first electric/electronic device 2 for this purpose (not shown). The electronic circuit arrangement 1 can be arranged on a common printed circuit board. The second electric/electronic device 3 can be connected to the electronic circuit arrangement 1, so that it is electrically connected to the first electric/electronic device 2 via the circuit arrangement 1.

For this purpose, the electronic circuit arrangement 1 comprises a first electric connection 4a, to which the first electronic device 2 can be connected. The electronic circuit arrangement 1 furthermore comprises a second electric connection 4b, to which the second electric/electronic device 3 is connected. This second electric connection 4b is electrically connected to the first electric connection 4a by means of a first electric conduction path 5. A second electric conduction path 6 electrically connects a tee point 7, which is provided in the first electric conduction path 5, to an electric ground connection 8. The ground connection 8, in turn, is electrically connected or can be connected to an electric ground/earth. For example, the two conduction paths 5, 6 can in each case be or comprise an electric conductor, if the electronic circuit arrangement 1 is realized on a common printed circuit board.

In the first electric conduction path 5, provision is made between the first electric connection 4a and the tee point 7 for a first switching element 9a, which can be switched between an open state, in which it electrically interrupts the first electric conduction path 5, and a closed state, in which this interruption is eliminated again. Provision is made in an analogous manner in the second electric conduction path 6 between the tee point 7 and the electric ground connection 8 for a second switching element 9b, which can be switched between an open state, in which it electrically interrupts the second electric conduction path 6, and a closed state, in which this interruption is eliminated.

In the example scenario of the figures, provision is made in the first electric conduction path 4 between the second electric connection 4b and the tee point 7 for a further, third switching element 9c, which is embodied analogous to the first switching element 9a. In other words, the third switching element 9c can also be switched between an open state, in which it electrically interrupts the first electric conduction path 5, and a closed state, in which this electric interruption is eliminated.

If the second electric/electronic device 3 is connected to the second electric connection 4b and thus to the first electric conduction path 5 as shown in FIG. 1, a connection to the first electric connection 4a and via the latter to the first electronic device 2 is to be present. The electronic circuit arrangement 1 is thus equipped in such a manner that, in response to electrically connecting the second electric/electronic device 3 to the second electric connection 4b, the second switching element 9b switches over to the open state and the first and the third switching element 9a, 9c switch over to the closed state. The switch-over process thereby occurs in such a manner that the first and the third switching element 9a, 9c are only switched over to the closed state 9b, when the second switching element 9b is already in the open state. A switching state, in which the first and/or the second electric connection 4a, 4b is electrically connected to the ground connection 8, is thus avoided, so that an undesired electric short-circuit current would flow. Such an electric short-circuit current could lead to damages to the two conduction paths 5, 6 of the first electric/electronic device 2 or of the second electric/electronic device 3.

FIG. 1 shows the second electric/electronic device 3 in a state, in which it is connected to the second electric connection 4b of the electronic circuit arrangement 1. The second switching element 9b is open in this scenario, so that the tee point 7 and thus also the first electric conduction path 5 are not grounded via the electric ground connection 8. In contrast, the first switching element 9a and the third switching element 9c are closed, so that the desired electric connection exists between the first electric connection 4a and the second electric connection 4b. In other words, the second electric/electronic device 3 is connected to the first electric/electronic device 2 via the first electric conduction path 5 in FIG. 1.

According to the invention, an electric disconnection of the second electric/electronic device 3 from the second electric connection 4b is associated with an electric grounding of the two electric conduction paths 5, 6. It is prevented through this that electric power in the form of electric charge carriers from the first electric/electronic device 2 is provided on the free second electric connection 4b and can be released into the environment 10. In an area exposed to explosion hazards, this could lead to the ignition of an explosive gas-air mixture, which is present in the environment 10, as a result of spark ignition.

Figure 2:
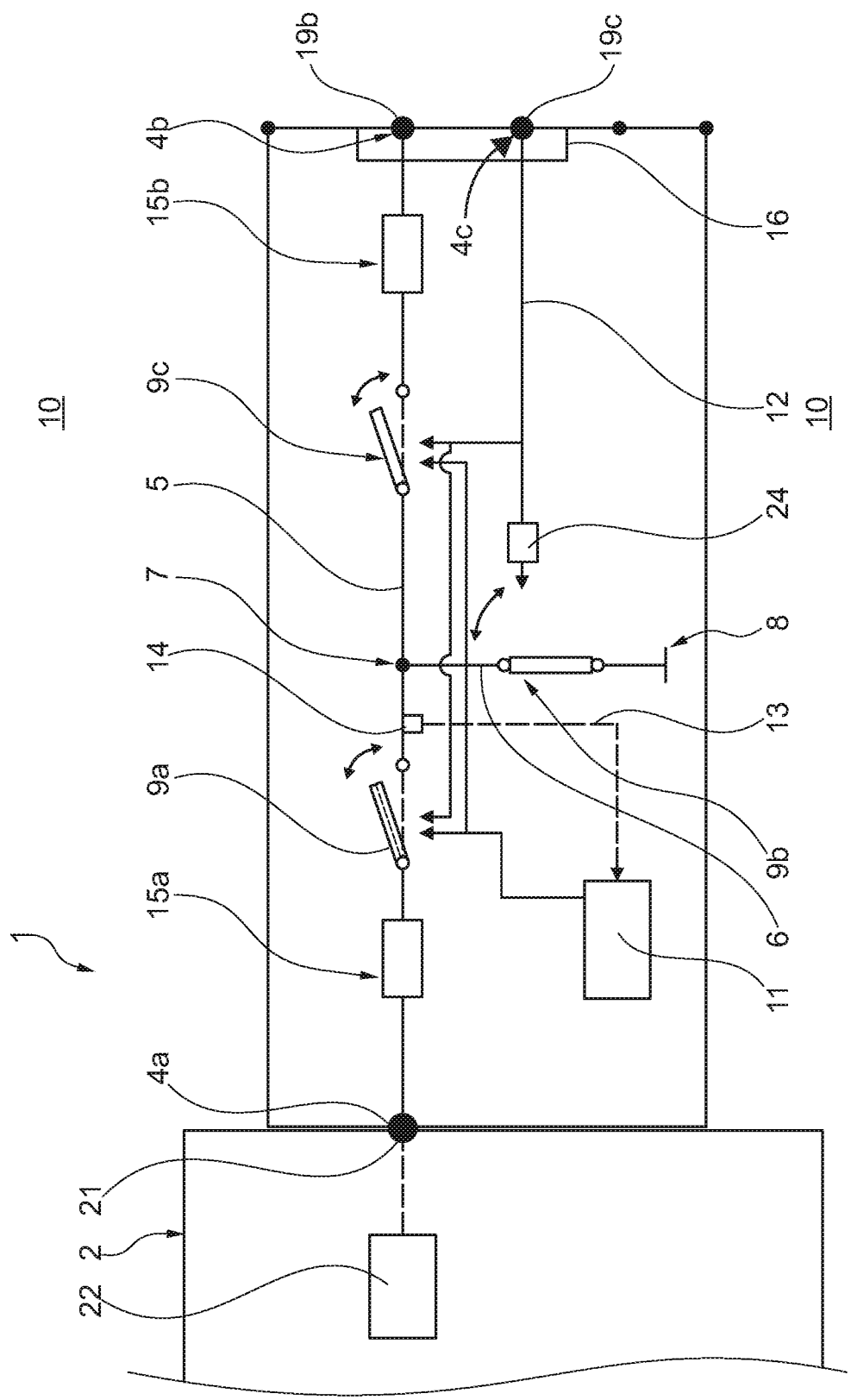
FIG. 2 shows the example of FIG. 1 in a state, in which the electric/electronic device is electrically disconnected from the circuit arrangement.

The state, which occurs after disconnecting the second electric/electronic device 3 from the second electric connection 4b in the circuit arrangement 1 with open first and third switching element 9a, 9c as well as with closed second switching element 9b is represented in the illustration of FIG. 2. In response to electrically disconnecting the second electric/electronic device 3 from the second electric connection 4b, the second switching element 9b is switched over from the open to the closed state. The first switching element 9a and the third switching element 9c are furthermore switched over from the closed to the open state. In this state of the circuit arrangement 1, the two electric conduction paths 5, 6 are connected to the electric ground connection 8, that is, the two electric conduction paths 5, 6 comprising the tee point 7 are electrically grounded. The switch-over of the switching elements 9a, 9b, 9c occurs in the course of the disconnection of the second electric/electronic device 3 form the second electric connection 4b in such a manner that the second switching element 9b is switched over to the closed state only when the first and the third switching element 9a, 9c are already in the open state. A state of the electronic circuit arrangement 1, in which both switching elements 9a, 9b are simultaneously in the closed state—albeit only for a short time period—is thus also avoided in response to disconnecting the second electric/electronic device 3 from the second electric connection 4b, which would represent an undesired electric short-circuit of the two electric connections 4a, 4b with the ground connection 8. By closing the second switching element 9b, electric power, which is present in the first or second electric conduction path 5, 6, respectively, can discharge via the ground connection 8 after opening the first and third switching element 9a, 9c. It is thus ensured that no electric power is present in the area of the tee point 7 in response to connecting the second electric/ electronic device 3 to the second electric connection 4b again (as described above). As a result, it is ensured by means of the electronic circuit arrangement 1 according to the invention that the first electric conduction path 5 is grounded immediately after disconnecting the second electric/electronic device 3. Electric power in the form of free electric charge carriers, which might be present at the interface connection 21 of the first electric/electronic device 2, can be discharged to the ground connection 8 in the course of the grounding via the first electric conduction path 5, the tee point 7 and the second electric conduction path 6. This means that no electric power can reach into the environment 10 of the electronic device 2 via the second electric connection 4b.

The third switching element 9c can be foregone in an alternative of the above-discussed example, the design of which is simplified.

The three switching elements 9a, 9b, 9c can in each case be embodied as electrically powerable electromagnetic relays. The first switching element 9a and the third switching element 9c are thereby preferably realized in such a manner that they switch over to the closed state in an electrically powered state and switch over to the open state in an electrically non-powered state. In contrast, the second switching element 9b is preferably realized in such a manner that it switches over to the open state in the electrically powered state and switches over to the closed state in the electrically non-powered state.

The electric power required for electrically powering the switching elements 9a, 9b, 9c, which are in each case embodied as electromagnetic relays, can be taken from an electric power source 17, which is provided in the second electric/electronic device 3. For this purpose, the first and the third electric connection 4a, 4c are embodied in such a manner that an electric connection of the second electric/electronic device 3 is automatically also associated with an electric connection of the second electric/electronic 3 to the third electric connection. The first and the third electric connection 4a, 4c are furthermore also embodied in such a manner that said electric connection in response to disconnecting the second electric/electronic device 3 from the second electric connection 4b is eliminated again. These characteristics of the second and third electric connection 4b, 4c are realized technically in the example, in that the three switching elements 9a, 9b, 9c are connected to the third electric connection 4c by means of an electric supply line 12. The third electric connection 4c, in turn, is connected to the electric power source 17, which is present in the second electric/electronic device 3, via a conduction path 23c, which is present in the second electric/electronic device 3, as long as the second electric/electronic device is connected to the second electric connection 4b and thus also to the third electric connection 4c.

The second and third electric connection 4b, 4c are realized as part of a common socket 16 (suggested only schematically in the figures), which is arranged on a housing wall (not shown) of the housing, which houses the electronic circuit arrangement 1—this can simultaneously be a part of the first electric/electronic device 2. The electric socket 16 is preferably provided complementary to an electric plug 18, which is provided on the second electronic device 3 or which can be connected thereto via an electric cable connection, so that socket 16 and plug 18 form a releasable plug connection 20. In an alternative, plug 18 and socket 16 can also be exchanged. The plug 18 can have connections 19b, 19c, which are complementary to the two electric connections 4b, 4c. The connection 19b can be electrically connected to an electric conduction path 23c, which forms a continuation of the first electric conduction path 5 in the second electric/electronic device 3. This can be a USB data or supply line. The electric connection 19c is electrically connected to the electric conduction path 23c and via the latter to the electric power source 17.

As illustrated in FIGS. 1 and 2, the electronic circuit arrangement 1 can comprise a control unit 11. By means of the latter, it can be determined, whether or not the tee point 7 is electrically connected to the ground connection 8. For this purpose, the electronic circuit arrangement 1 comprises a sensor element 14, which cooperates with the control unit 11 via an electric sensor line 13. The sensor element 14—this can be an electric voltage sensor in the manner of a voltmeter, for example—transmits to the control unit 11 via the sensor line 13, whether or not the electric tee point 7 is electrically connected to the ground connection 8. It can thus be determined indirectly, whether the second switching element 9b is in the open or closed state. The control unit 11 is now equipped/programmed in such a manner that, after connecting the second electric/electronic device 3 to the second electric connection 4b, it prevents an electric powering of the first and third switching element 9a, 9c via the electric supply line 12 for switching over to the closed state until it was determined with the help of the sensor element 14 that the tee point 7 is no longer connected to the ground connection 8. In other words, the control unit 11 ensures that the first and the third switching element 9a, 9c, which are in each case embodied as electromagnetic relays, are switched over to the closed state only when the second switching element 9b is already in the open state.

To also prevent an undesired electric short-circuit current from the tee point 7 to the ground connection 8 in response to disconnecting the second electric/electronic device 3 from the second electric connection 4b, the electronic circuit arrangement 1 can comprise an electronic delay circuit 24, which delays the switch-over of the second switching element 9b from the open to the closed state in such a manner.

For this purpose, a predetermined first time period can define a time period $t_1$, which the first switching element 9a requires for switching over from the closed to the open state. Accordingly, a predetermined second time period $t_2$ defines a time period, which the second switching element 9b requires for switching over from the open to the closed state. Finally, a predetermined third time period $t_3$ defines a time period, which the third switching element 9c requires for switching over from the closed to the open state. The electronic circuit arrangement 1 is embodied in such a manner that the predetermined second time period $t_2$ is in each case larger than the predetermined first time period and/or the predetermined third time period $t_3$. For this purpose, the delay, which is caused by the delay circuit 24, occurs in such a manner that the predetermined second time period $t_2$ is larger than the predetermined first time period $t_1$ and also larger than the predetermined third time period $t_3$. The delay circuit 24, which is only illustrated in a roughly schematic manner in the figures, can be realized technically by means of an electric capacitance (now shown), which is arranged in the electric supply line 12 and which thus "buffers" the electric power supply of the second switching element 9b, which is embodied as relay.

In the event of a malfunction of the electronic circuit arrangement 1 such that the first or third switching element 9a, 9c, respectively, does not properly switch over to the open state, the first or second electric connection 4a, 4b, respectively, electrically short-circuits with the electric ground connection 8 when the second switching element 9b is closed. To prevent a permanent electric short-circuit current to the ground connection 8, which is associated therewith, a first electric fuse element 15a is arranged in the first electric conduction path 5 between the tee point 7 and the first electric connection 4a. The first fuse element 15a permanently interrupts the first electric conduction path 5, as soon as the electric/current, which flows through the first electric fuse element 15a, exceeds a predetermined maximum value. As shown in FIG. 1, a second electric fuse element 15b can additionally or in the alternative also be arranged in the first electric conduction path 5 between the tee point 7 and the second electric connection 4b. A second electric fuse element 15b also permanently interrupts the first electric conduction path 5a, as soon as the electric current, which flows through the second electric fuse element 15*b*, exceeds a predetermined maximum value.

The invention claimed is:

1. An electronic circuit arrangement comprising:
a first electric connection connectable to a first electronic device;
a second electric connection connectable to a second electronic device;
a first electric conduction path connecting the first electric connection to the second electric connection;
a second electric conduction path electrically connecting a tee point, which is provided in the first electric conduction path, to an electric ground connection,
a first switching element provided in the first electric conduction path between the first electric connection and the tee point, the first switching element being switchable between a first open state, in which the first switching element electrically interrupts the first electric conduction path, and a first closed state, in which the first electric conduction path is uninterrupted; and
a second switching element provided in the second electric conduction path between the tee point and the electric ground connection, the second switching element being switchable between a second open state, in which the second switching element electrically interrupts the second electric conduction path, and a second closed state, in which the second electric conduction path is uninterrupted;
a third switching element provided between the second electric connection and the tee point, the third switching element being switchable between a third open state, in which the third switching element electrically interrupts the first electric conduction path, and a third closed state, in which the first electric conduction path is uninterrupted;
wherein, in response to electrically connecting the second electronic device to the second electric connection, the second switching element is configured to switch over to the second open state and the first switching element switches over to the first closed state only when the second switching element is already in the second open state;
wherein, in response to electrically disconnecting the second electronic device from the second electric connection, the first switching element is configured to switch over to the first open state and the third switching element is configured to switch over to the third open state before the second switching element switches over to the second closed state;
wherein the second switching element is configured to switch over to the second closed state to discharge electric power from the first and second electric conduction paths via the ground connection of the second switching element while the first and third switching elements are in the respective first and third open states;
wherein the second switching element in the second open state is configured to cause switch over of the first and third switching elements to the respective first and third closed states;
further including a control unit connected to the first switching element and the third switching element and configured to determine whether or not the tee point is electrically connected to the ground connection, but not configured to control the second switching element; and
wherein after connecting the second electronic device to the second electric connection, the control unit is configured to prevent an electric powering of the first switching element and the third switching element for switching over to the first closed state and the third closed state, respectively, until after determining that the tee point is no longer connected to the ground connection.

2. The electronic circuit arrangement according to claim 1, wherein at least one of:
the first switching element is an electrically powerable electromagnetic relay such that, in an electrically powered state, the first switching element switches over to the first closed state in response to closing the third switching element, and in an electrically non-powered state, the first switching element switches over to the first open state in response to disconnecting the first electronic device; and
the second switching element is an electrically powerable electromagnetic relay such that in the electrically powered state the second switching element switches over to the second open state and, in response to disconnecting the second electronic device, and in the electrically non-powered state, the second switching element switches over to the second closed state in response to opening the at least one of the first and third switching elements.

3. The electronic circuit arrangement according to claim 2, further comprising a first electric fuse element arranged in the first electric conduction path between the tee point and the first electric connection, the first electric fuse element permanently electrically interrupting the first electric conduction path when the electric current, which flows through the first electric fuse element, exceeds a predetermined maximum value.

4. The electronic circuit arrangement according to claim 3, further comprising a second electric fuse element arranged in the first electric conduction path between the tee point and the second electric connection, the second electric fuse element permanently interrupting the first electric conduction path when the electric current, which flows through the second electric fuse element, exceeds a predetermined maximum value.

5. The electronic circuit arrangement according to claim 1, further comprising a sensor element coupled to the first electric conduction path between the first switching element and the tee point, wherein the sensor element cooperates with the control unit via a sensor line to determine whether or not the electric tee point is electrically connected to the ground connection.

6. The electronic circuit arrangement according to claim 5, further comprising at least one of:
a first electric fuse element arranged in the first electric conduction path between the tee point and the first electric connection, the first electric fuse element permanently electrically interrupting the first electric conduction path when the electric current, which flows through the first electric fuse element, exceeds a predetermined maximum value; and
a second electric fuse element arranged in the first electric conduction path between the tee point and the second electric connection, the second electric fuse element permanently interrupting the first electric conduction path when the electric current, which flows through the second electric fuse element, exceeds a predetermined maximum value.

7. The electronic circuit arrangement according to claim 1, wherein, in addition to the first switching element, the third switching element switches over to the third closed state in response to electrically connecting the second electronic device to the second electric connection only when the second switching element is already in the second open state.

8. The electronic circuit arrangement according to claim 1, wherein:
   a predetermined first time period ($t_1$) defines a time period, which the first switching element requires for switching over from the first closed state to the first open state;
   a predetermined second time period ($t_2$) defines a time period, which the second switching element requires for switching over from the second open to the second closed state; and
   the predetermined second time period ($t_2$) is larger than the predetermined first time period ($t_1$).

9. The electronic circuit arrangement according to claim 8, further comprising an electronic delay circuit, which delays the switch-over of the second switching element from the second open state to the second closed state in such a manner that the predetermined second time period ($t_2$) is larger than the predetermined first time period ($t_1$).

10. The electronic circuit arrangement according to claim 1, wherein at least one of the first and the second switching element is connectable to a third electric connection by an electric supply line, the third electric connection being connectable to an electric power source provided in the second electronic device.

11. The electronic circuit arrangement according to claim 10, wherein the first and the third electric connection are embodied in such a manner that a connection of the second electronic device to the second electric connection is associated with an electric connection of the second electronic device to the third electric connection, wherein the electric connection of the second electronic device to the second electric connection is eliminated in response to disconnecting the second electronic device from the second electric connection.

12. The electronic circuit arrangement according to claim 1, further comprising a first electric fuse element arranged in the first electric conduction path between the tee point and the first electric connection, the first electric fuse element permanently electrically interrupting the first electric conduction path when the electric current, which flows through the first electric fuse element, exceeds a predetermined maximum value.

13. The electronic circuit arrangement according to claim 12, further comprising a second electric fuse element arranged in the first electric conduction path between the tee point and the second electric connection, the second electric fuse element permanently interrupting the first electric conduction path when the electric current, which flows through the second electric fuse element, exceeds a predetermined maximum value.

14. The electronic circuit arrangement according to claim 1, wherein:
   a predetermined first time period ($t_1$) defines a time period, which the first switching element requires for switching over from the first closed state to the first open state;
   a predetermined third time period ($t_3$) defines a time period, which the third switching element requires for switching over from the third closed state to the third open state;
   a predetermined second time period ($t_2$) defines a time period, which the second switching element requires for switching over from the second open state to the second closed state; and
   the predetermined second time period ($t_2$) is larger than each of the predetermined first time period ($t_1$) and the predetermined third time period ($t_3$).

15. The electronic circuit arrangement according to claim 14, further comprising an electronic delay circuit, which delays the switch-over of the second switching element from the second open state to the second closed state in such a manner that the predetermined second time period ($t_2$) is larger than the predetermined first time period ($t_1$) and the predetermined third time period ($t_3$).

16. The electronic circuit arrangement according to claim 1, wherein at least one of the first switching element, the second switching element, and the third switching element is connectable to a third electric connection by an electric supply line, the third electric connection being connectable to an electric power source provided in the second electronic device.

17. The electronic circuit arrangement according to claim 16, wherein a connection of the second electronic device to the second electric connection is associated with an electric connection of the second electronic device to the third electric connection, wherein the electric connection of the second electronic device to the second electric connection is eliminated in response to disconnecting the second electronic device from the second electric connection.

* * * * *